US006996272B2

(12) United States Patent
Chen et al.

(10) Patent No.: US 6,996,272 B2
(45) Date of Patent: Feb. 7, 2006

(54) APPARATUS AND METHOD FOR REMOVING BACKGROUND ON VISUAL

(75) Inventors: Jiann-Jone Chen, Taichung Hsien (TW); Jau-Fu Liu, Keelung (TW); I-Yen Chen, Kaohsiung (TW); Cheng-Yi Liu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 599 days.

(21) Appl. No.: 10/193,393

(22) Filed: Jul. 11, 2002

(65) Prior Publication Data

US 2003/0198382 A1 Oct. 23, 2003

(30) Foreign Application Priority Data

Apr. 23, 2002 (TW) .............................. 91108320 A

(51) Int. Cl.
*G06K 9/34* (2006.01)
(52) U.S. Cl. ...................... 382/173; 382/164; 382/283
(58) Field of Classification Search ................ 382/103, 382/162, 163, 164, 173, 282, 283; 358/538; 345/634, 635
See application file for complete search history.

(56) References Cited

U.S. PATENT DOCUMENTS

| | | | | |
|---|---|---|---|---|
| 5,196,922 A | * | 3/1993 | Yeomans | 348/578 |
| 5,630,037 A | * | 5/1997 | Schindler | 345/592 |
| 5,914,748 A | * | 6/1999 | Parulski et al. | 348/239 |
| 6,134,346 A | * | 10/2000 | Berman et al. | 382/163 |
| 6,288,703 B1 | * | 9/2001 | Berman et al. | 345/600 |
| 6,337,917 B1 | * | 1/2002 | Onural et al. | 382/107 |

OTHER PUBLICATIONS

"Background removal in image indexing and retrieval", International Conference Image Analysis and Processing, 1999, Lu and Hong Guo.
A hierarchical approach to color image segmentation using homogeneity, IEEE Trans Image Processing, pp. 2071-2082, vol. 9, No. 12, 2000, H. D. Cheng and Y. Sun.
"Image segmentation using hierarcical meshes", IEEE International Conference Image Processing, pp. 6-10, 1999, D.K. Lim and Y.S. Ho.
"Segmentation approach using local image statistics", Electronics letters, vol. 36, No. 14, pp. 1199-1201, 2000.
P. Felzenszwalb, D. Huttenlocher, "Image segmentation using local variation", Proc. IEEE Conference on Computer Vision and Pattern Recognition, pp. 98-104, 1998.
D. Comaniciu et al, "Mean shift analysis and applications", IEEE Conference Computer Vision, pp. 1197-1203, 1999.
Y. Deng et al, "Color image segmentation", IEEE Conference on Computer Vision and Pattern Recognition, pp. 446-451, 1999.

* cited by examiner

*Primary Examiner*—Vikkram Bali
*Assistant Examiner*—Colin LaRose

(57) ABSTRACT

A background removal apparatus comprises a color normalization module that normalizes an original image, and an image segmentation module that segments the normalized image into several segmented regions. A background mesh generation module simulates the variation of pixel colors in background and generates an interpolated background mesh. A comparison module compares the normalized image and the interpolated background mesh to form a background mask by extracting the coherent regions between them. A refinement module uses a refined rule to determine a final background mask, and a background removal module through which a pure foreground image is obtained. The apparatus combines the efficiency of both color and spatial clustering, and improves the capabilities of current image segmentation method to perform background removal.

20 Claims, 9 Drawing Sheets

APPARATUS AND METHOD FOR REMOVING BACKGROUND ON VISUAL

FIELD OF THE INVENTION

The present invention relates generally to an apparatus and method for image video content retrieval, and more specifically to an apparatus and method for removing background on visual content.

BACKGROUND OF THE INVENTION

Content-based retrieval techniques for multimedia become important after international coding standards, such as JPEG, MPEG-1, MPEG -2, MPEG -4, have been finalized and widely distributed over the internet. The international standard for multimedia (MM) content description, MPEG-7, has been proposed to provide normal numerical descriptors as the matching criteria for similarity measurement in search engine. For describing image/video content in MPEG-7, the statistics of color, shape information and motion behavior in the content are defined. In general, searching for MM content is always guided by retrieving the desired visual information content. To better reflect human recognized information in visual descriptors, background information in multimedia content should be separated from the image object. Several methods have been proposed to identify background region in MM content.

In the disclosure, "Background removal in image indexing and retrieval", International Conference Image Analysis and Processing, 1999, Lu and Hong Guo utilize fuzzy clustering technique for color image segmentation and, for each segmented region, size and adjacency with border are used to determine whether it belongs to background or not. Then the regions categorized into background are removed before feature extraction.

In the disclosure, "Image segmentation using hierarchical meshes", IEEE International Conference Image Processing, pp. 6–10, 1999, D. K. Lim and Y. S. Ho use the hierarchical meshes to locate the object boundary in an image first, and then perform region growing based on the detected boundary points to yield the final image object. In the disclosure, "A hierarchical approach to color image segmentation using homogeneity", IEEE Trans. Image Processing, pp. 2071–2082, vol. 9, no. 12, 2000, H. D. Cheng and Y. Sun also use hierarchical histogram to locate uniform regions for further region merging to generate the final segmented image. For natural image segmentation, a reduced set of regions are identified and proposed by using a K-means method based on local image statistics, i.e., mean and variance. The K-means method is disclosed in the art of "Segmentation approach using local image statistics", Electronics letters, vol. 36, no. 14, pp. 1199–1201, 2000.

Color clustering is another approach for effective background removal and for facilitating the image retrieval. These related arts are disclosed in P. Felzenszwalb, D. Huttenlocher, "Image segmentation using local variation", Proc. IEEE Conference on Computer Vision and Pattern Recognition, pp. 98–104, 1998; D. Comaniciu et al, "Mean shift analysis and applications", IEEE Conference Computer Vision, pp. 1197–1203, 1999; and Y. Deng et al, "Color image segmentation", IEEE Conference on Computer Vision and Pattern Recognition, pp. 446–451, 1999. The later two arts cannot retrieve the visual object from the visual content.

The segmentation methods described above can be categorized into two approaches, i.e., clustering in the color space based on histogram vs. clustering in the Euclidean space based on homogeneity. The histogram based approach can cluster far-flung image pixels into the same region if they are close enough in color space. Because no spatial distances are adopted for this kind of clustering, it may result in noises in segmented regions. If spatial distances are adopted for the gray-level homogeneity, the sparse noises in segmented regions can be reduced by this kind of distance clustering. These two approaches are complementary.

Most image processing methods above divide two-dimensional images into blocks. Each block includes pixels that are considered as a basic image block for processing. The statistics of the pixels in an image block, such as mean and variance, are usually computed for either clustering or division. Methods are designed according to their specific application. For processing visual database, the contents are divergent and hence a comprehensive approach should be addressed.

SUMMARY OF THE INVENTION

The present invention has been made to overcome the above-mentioned drawbacks of the conventional arts. It combines the efficiency that color and spatial clustering can offer to yield a robust background removal apparatus for visual content. The main technique of the invention is to construct a two-dimensional mesh to represent the variation of pixel colors in background, and the background mesh that simulates the background color variations of the image is constructed and subtracted to extract foreground object. It is processed with complementary approaches, i.e., local features of color images are used and guided by the global aspect, and could be applied to most visual contents with discriminated background/foreground.

According to the invention, the background removal apparatus for visual content mainly generates a background mesh to identify background and foreground on visual content. It comprises a color normalization module, an image segmentation module, a background mesh generation module, a comparison module, a refinement module, and a background removal module. The color normalization module first normalizes an original image. The normalized image is then fed into the image segmentation module and the background mesh generation module respectively. The image segmentation module segments the normalized image into several segmented regions.

The background mesh generation module further includes sub-modules for resolution reduction, border color averaging, comparison, growing, and interpolation. According to the normalized image, the background mesh generation module simulates the variation of pixel colors in background and generates an interpolated background mesh. The comparison module compares the normalized image and the interpolated background mesh to locate the coherent regions between them, and then forms a background mask by extracting the coherent regions. Based on the background mask and the segmented regions, the refinement module uses an improved rule to determine a final background mask. Finally, the background removal module extracts the foreground of the original image according to the final background mask and the original image.

The method of the present invention for removing background on visual content mainly comprises the procedures of generating background mesh and identifying background and foreground. The procedure of generating background mesh first normalizes the dynamic ranges of the color component values of the original image. The normalized image is then used to generate the background mesh. By comparing the normalized image and the background mesh, and locating the coherent regions between them, a background mask for discriminating background and foreground regions is generated. This background mask provides the global aspect of image background/foreground information and is generally accurate enough for shape description. For images with poor contrast, background mask is further refined to reduce small fluctuations along the background and foreground boundary if the locally segmented regions are available.

The steps of generating background mesh first reduces the resolution of the normalized image to form a reduced image. Each pixel in the reduced image is regarded as one block, and the mean of the color vectors of border blocks is computed. The final background blocks are identified recursively according to a decision rule, and then used as the anchor blocks for interpolation to generate a solid background mesh.

The apparatus and method of the present invention combine the efficiency of the color and spatial clustering. It also improves the capabilities of current generalized image segmentation method to perform background removal. Specifically, it provides a useful pre-processing control for MPEG-7 related applications.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 1b is the background mesh of FIG. 1a.

DETAILED DESCRIPTION OF THE PREFERRED EMBODIMENTS

FIG. 1 illustrates the present invention that uses a background mesh to simulate the background color variation of an original image. FIG. 1a illustrates the variation of pixel colors of an original image. FIG. 1b is the background mesh of FIG. 1a. FIGS. 1c–1d illustrate the variation of gray levels for FIG. 1a and FIG. 1b respectively. As can be seen from FIG. 1, for images with simple or discriminated background, there exists a smooth two-dimensional mesh (i.e., $1^{st}$ derivative continuous) as shown in FIG. 1d that represents the variation of background gray-levels as shown in FIG. 1b. If the background in an image is well simulated by the background mesh, the foreground object can be easily extracted by removing the background.

As stated before, the apparatus for removing background on visual content according to the present invention mainly comprises a first module for generating background mesh and a second module for identifying background and foreground. The following illustrates how to utilize the background mesh generation module and the background and foreground identification module in order to identify the background regions and foreground regions.

Figure 1A:
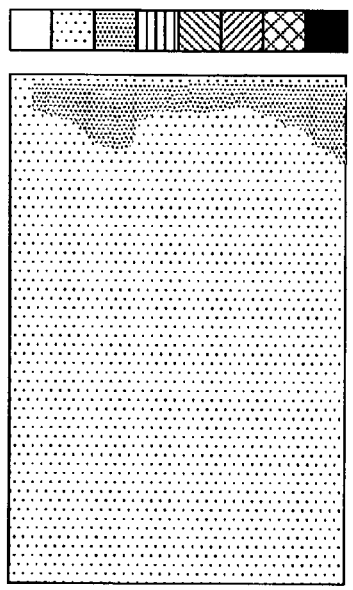
FIG. 1a illustrates the variation of the pixel colors of an original image.
Figure 1B:
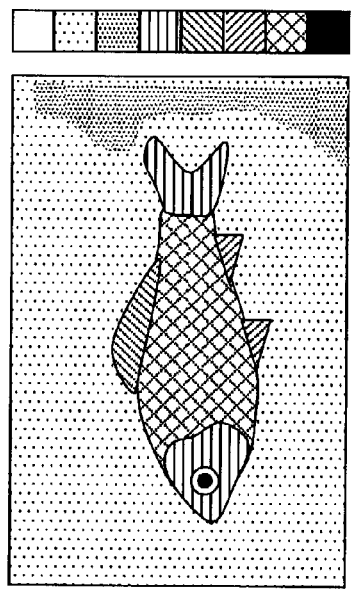
Figure 1C:
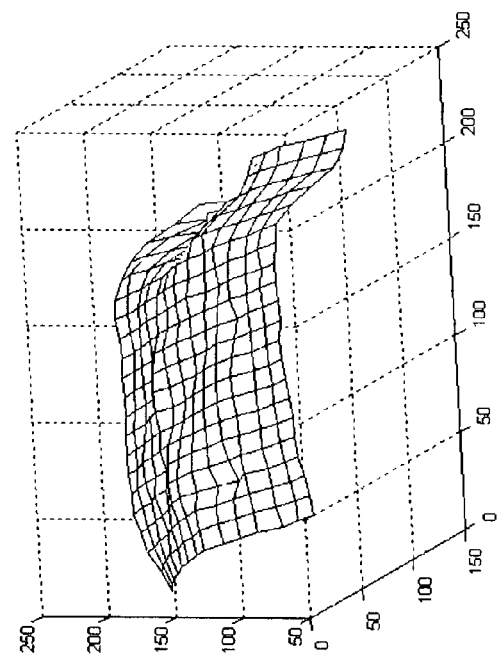
FIGS. 1c–1d illustrate the variation of gray levels for FIG. 1a and FIG. 1b respectively.
Figure 1D:
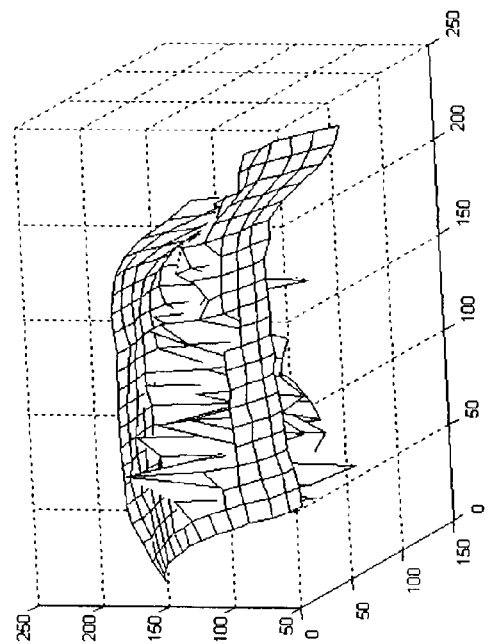
Figure 2A:
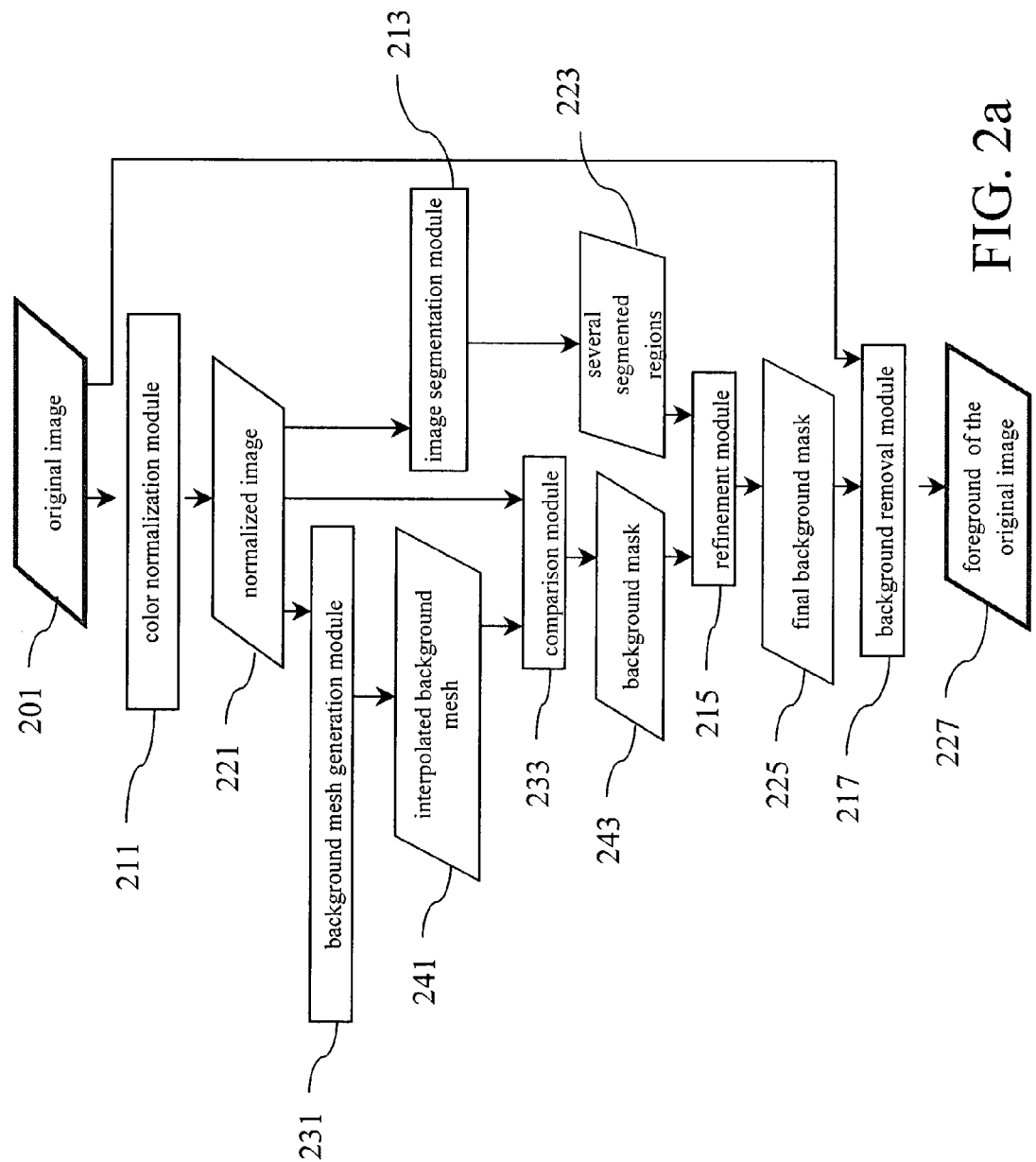
FIG. 2a shows the flow diagram of the apparatus for removing background on visual content according to the invention.

FIG. 2a shows a flow diagram of the apparatus for removing background on visual content according to the invention. Referring to FIG. 2a, a color normalization module 211 first takes an original image 201 and normalizes the image. The normalized image 221 is then fed into the image segmentation module 213 and the background mesh generation module 231 respectively. The image segmentation module 213 segments the normalized image into several regions 223 by using an image segmentation method. According to the normalized image 221, the background mesh generation module 231 simulates the variation of pixel colors in the background and generates an interpolated background mesh 241. The comparison module 233 compares the normalized image 221 and the interpolated background mesh 241 to locate the coherent regions between them, and then forms a background mask 243 by extracting the coherent regions. According to the background mask 243 and the segmented regions, the refinement module 215 uses a refined rule and determines a final background mask 225. Finally, the background removal module 217 generates the foreground 227 of the original image according to the final background mask 225 and the original image 201.

Figure 2B:
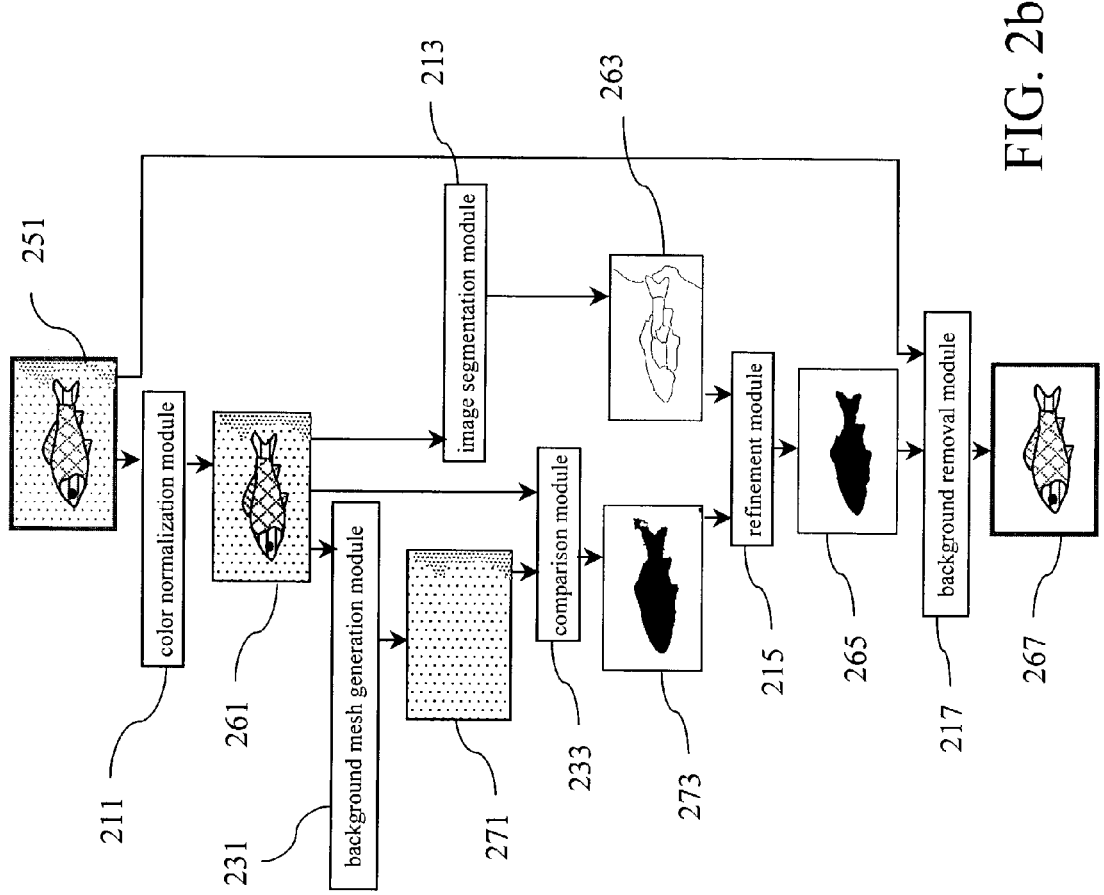
FIG. 2b is a flow diagram of the apparatus shown in FIG. 2a for processing an original image of a fish.

In the following embodiment, for reasons of clarity, an image of fish is selected as an example for illustration. FIG. 2b is a flow diagram of the processing in the apparatus of the present invention for removing the background of the image of the fish. In FIG. 2b, the original image 251 with both background and foreground is normalized first. An image 261 with a different contrast ratio is then generated. The normalized image 261 is fed into the image segmentation module 213 and the background mesh generation module 231 respectively. The image segmentation module 213 segments the normalized image 261 into several regions 263.

According to the normalized image 261, the background mesh generation module 231 simulates the variation of pixel colors in the background and generates an interpolated background mesh 271. The comparison module 233 compares the normalized image 261 and the interpolated background mesh 271 to locate the coherent regions between them, and then forms a raw background mask 273 by extracting the coherent regions. The refinement module 215 uses an improved rule and determines a final background mask 265. Further refinement of the fragmentation along background/foreground boundary is performed to generate the final background mask 265. Finally, the background removal module 217 generates the foreground 267 of the original image 251 according to the final background mask 265 and the original image 251.

The following describes in more detail the purpose of image normalization and the equations used in the color normalization module 211. Image normalization is to adjust the intensities of RGB components for each image so that images with different illumination contrast can be processed with uniform rules and parameters thereafter. The normalization equation may be linear or nonlinear, and the intensities of RGB components are rescaled in order to have a minimum value 0 and a maximum value 255.

Let $r_o(i, j)$, $g_o(i, j)$, and $b_o(i, j)$ denote the intensities of R, G, B components in pixel (i, j) of the original image respectively, $r_n(i, j)$, $g_n(i, j)$, and $b_n(i, j)$ denote the intensities of R, G, B components in pixel (i, j) of the normalized image respectively, and max and min denote the maximum and minimum functions respectively. For simplicity, the intensities of RGB components are rescaled linearly according to the following equation.

$$r_n(i, j) = \frac{r_o(i, j) - r_{\min}}{r_{\max} - r_{\min}} \times 255, \text{ where } r_{\max} = \max_{i,j}(r_o(i, j)) \text{ and } r_{\min} = \min_{i,j}(r_o(i, j));$$

$$g_n(i, j) = \frac{g_o(i, j) - g_{\min}}{g_{\max} - g_{\min}} \times 255, \text{ where } g_{\max} = \max_{i,j}(g_o(i, j)) \text{ and } g_{\min} = \min_{i,j}(g_o(i, j));$$

$$\text{and } b_n(i, j) = \frac{b_o(i, j) - b_{\min}}{b_{\max} - b_{\min}} \times 255, \text{ where } b_{\max} = \max_{i,j}(b_o(i, j)) \text{ and } b_{\min} = \min_{i,j}(b_o(i, j)).$$

Figure 3:
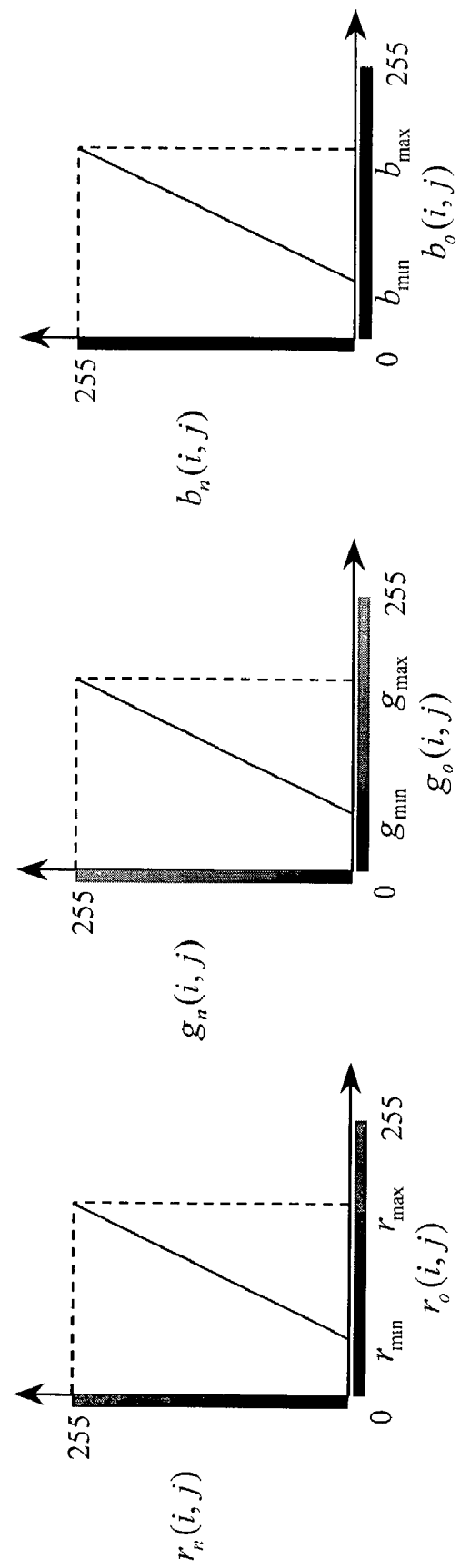
FIG. 3 illustrates linear color normalization functions implemented by the color normalization module according to the invention.

These linear color normalization functions are illustrated in FIG. 3.

Figure 4A:
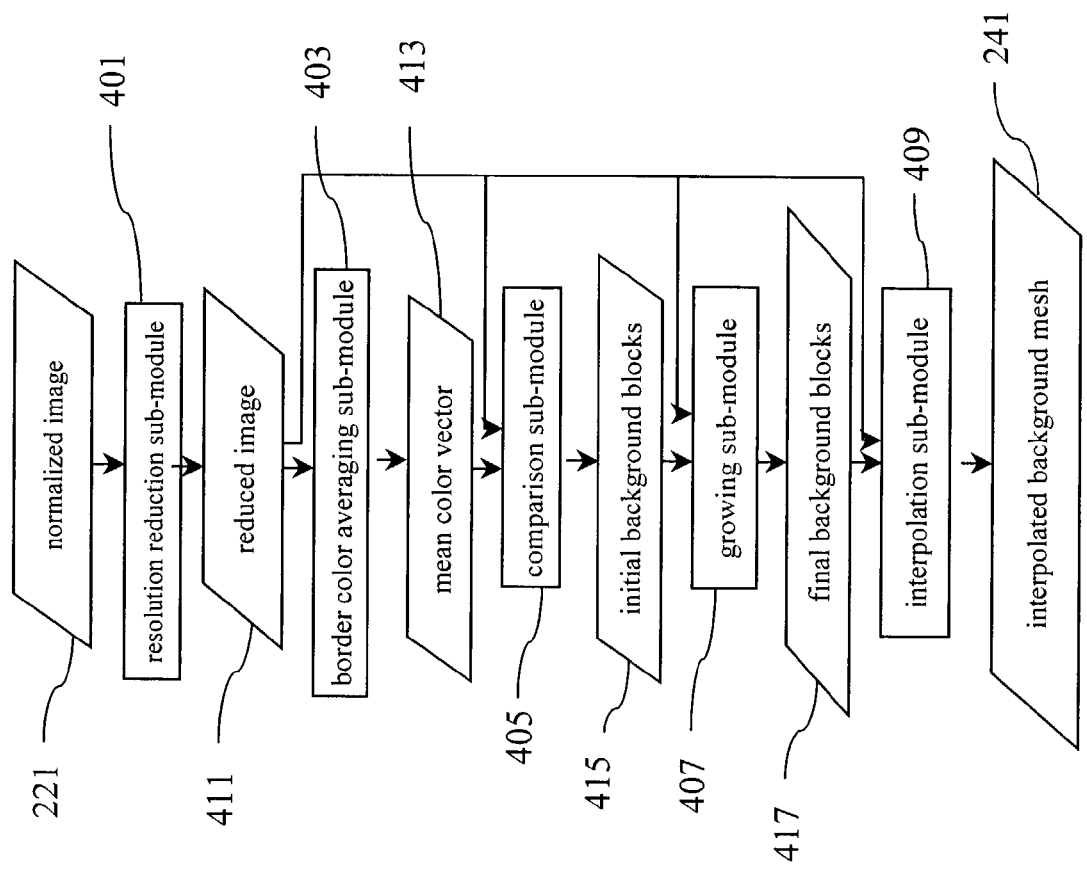
FIG. 4a shows the flow diagram of the background mesh generation module according to the invention.

The background mesh generation module of the invention further includes sub-modules for resolution reduction, border color averaging, comparison, growing, and interpolation. FIG. 4a illustrates the flow diagram of the background mesh generation module. In FIG. 4a, the resolution reduction sub-module 401 first reduces the resolution of the normalized image 221 and forms a reduced image 411. Each pixel in the reduced image 411 is regarded as one block. The mean color vector 413 for border blocks is calculated through a border color averaging sub-module 403. According to the mean color vector 413 and the reduced image 411, the comparison sub-module 405 uses a first decision rule to determine the initial background blocks 415. The growing sub-module 407 repeatedly extends the initial background blocks 415 towards the neighboring pixels to form final background blocks 417 based on a second decision rule. By having the final background blocks 417 as the anchor blocks for interpolation, the interpolation sub-module 409 generates a solid and interpolated background mesh 241 based on the reduced image 411.

Figure 4B:
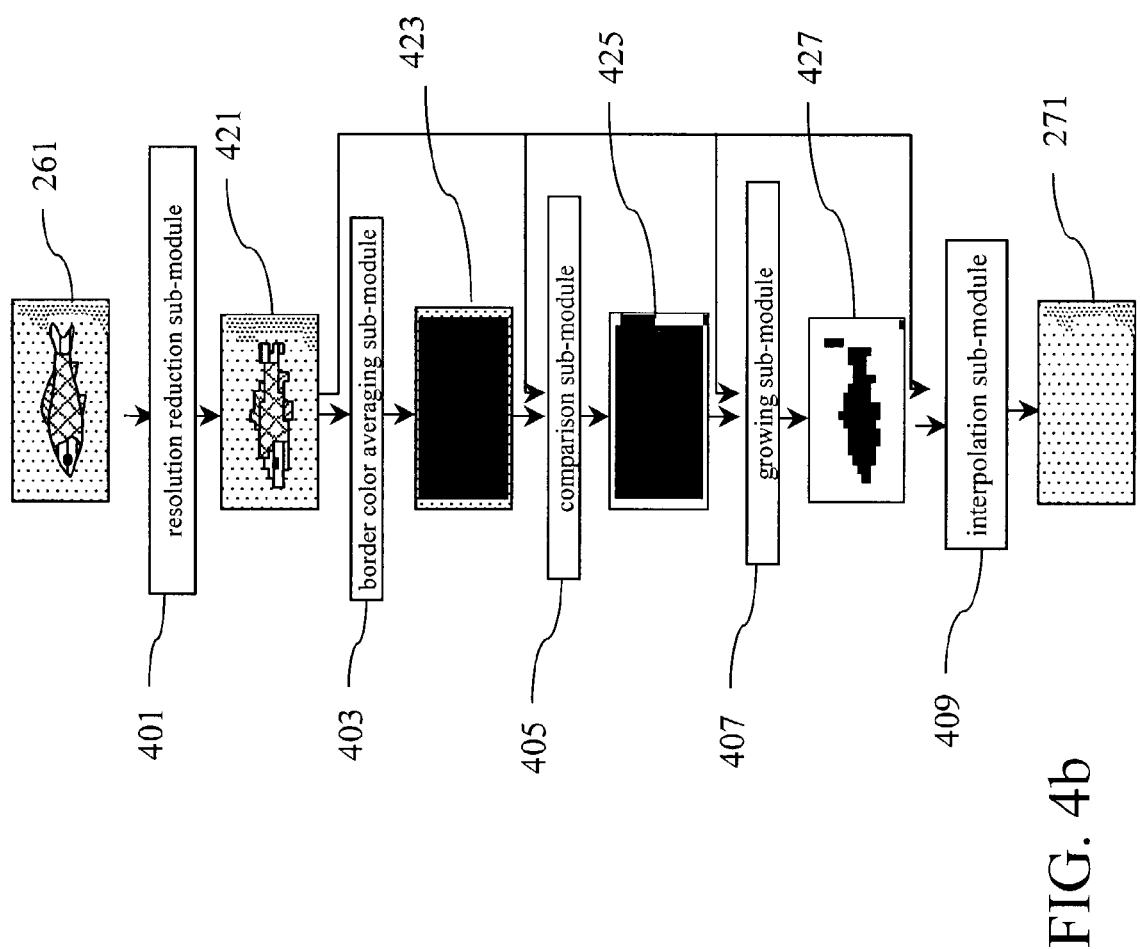
FIG. 4b illustrates the control flow of FIG. 4a by using a normalized real image.

FIG. 4b further illustrates the control flow of FIG. 4a by utilizing the normalized real image 261. In FIG. 4b, the resolution reduction sub-module 401 reduces the resolution of the normalized image 261 to form the reduced image 421. The mean color vector 423 for border blocks of the reduced image 421 is calculated through the border color averaging sub-module 403. According to the mean color vector 423 and the reduced image 421, the comparison sub-module 405 uses a first decision rule to determine the initial background blocks 425. The growing sub-module 407 repeatedly extends the initial background blocks 425 towards the neighboring pixels to form the final background blocks 427 according to the second decision rule. By using the final background blocks 427 as the anchor blocks for interpolation, the interpolation sub-module 409 generates the solid and interpolated background mesh 271 based on the reduced image 421.

Figure 5A:
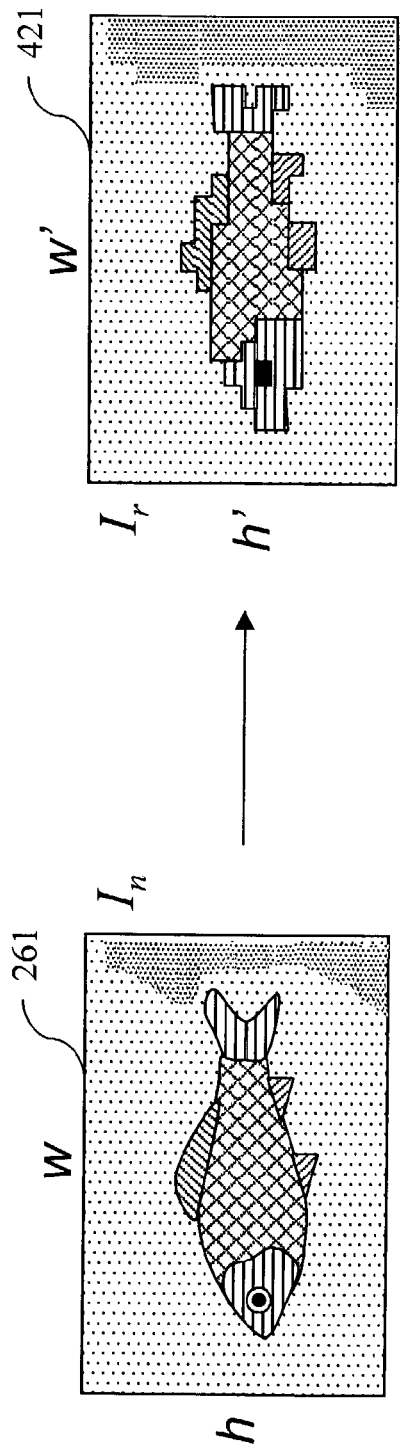
FIG. 5a illustrates the normalized image and the reduced image for an original image of a fish.

The following illustrates the preferred rules used in each sub-module in the background mesh generation module of the invention. The resolution reduction sub-module 401 reduces the resolution of the normalized image $I_n$ from h×w to h'×w', i.e. the resolution of the reduced image $I_r$ is h'×w', where h, w, h' and w' are integers and h'≦h, w'≦w. FIG. 5a illustrates the normalized image 261 and the reduced image 421. Several approaches may be used to determine the size of h' and w'. For example, h' and w' are predefined parameters, h'/h and w'/w are predefined parameters, or h' and w' are determined by statistics from image analysis on the normalized image. The statistics may be mean or variance.

Let $\vec{c}_n(i, j)$ and $\vec{c}_r(i', j')$ denote the color vector (r,g,b) of the image pixel (i, j) before and after resolution reduction respectively. Two preferred methods for mapping color vectors between $\vec{c}_n(i, j)$ and $\vec{c}_r(i', j')$ have been implemented in the resolution reduction sub-module 401. One is referred to as uniformly distributed pixel mapping. The other is referred to as block division and color averaging.

Figure 5B:
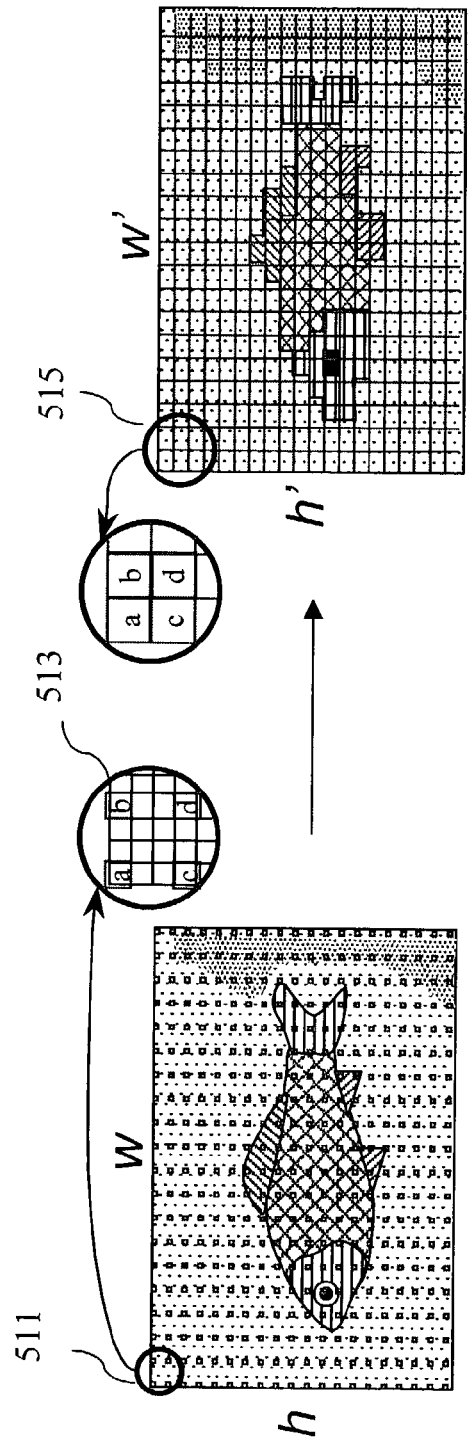
FIG. 5b illustrates the method of uniformly distributed pixel mapping implemented by the resolution reduction sub-module according to the invention.

According to the method of uniformly distributed pixel mapping, mapping of color vectors between $\vec{c}_n(i, j)$ and $\vec{c}_r(i', j')$ is accomplished through the following equations:

$$\vec{c}_r(i', j') = \vec{c}_n(i, j), \text{ where } i'=1, 2, \ldots, h', j'=1, 2, \ldots, w',$$

$$i = \left[1 + \frac{h-1}{h'-1}(i'-1)\right], j = \left[1 + \frac{w-1}{w'-1}(j'-1)\right],$$

and [x] means rounding a number x to its nearest integer. FIG. 5b illustrates the method of uniformly distributed pixel mapping. In FIG. 5b, pixel blocks 511 at the left upper corner in the normalized image are enlarged as pixel blocks 513. At the four corners of the pixel blocks 513, the four pixel blocks a, b, c, and d are mapped into four pixel blocks 515 at the left upper corner in the reduced image with their original color vectors.

Figure 5C:
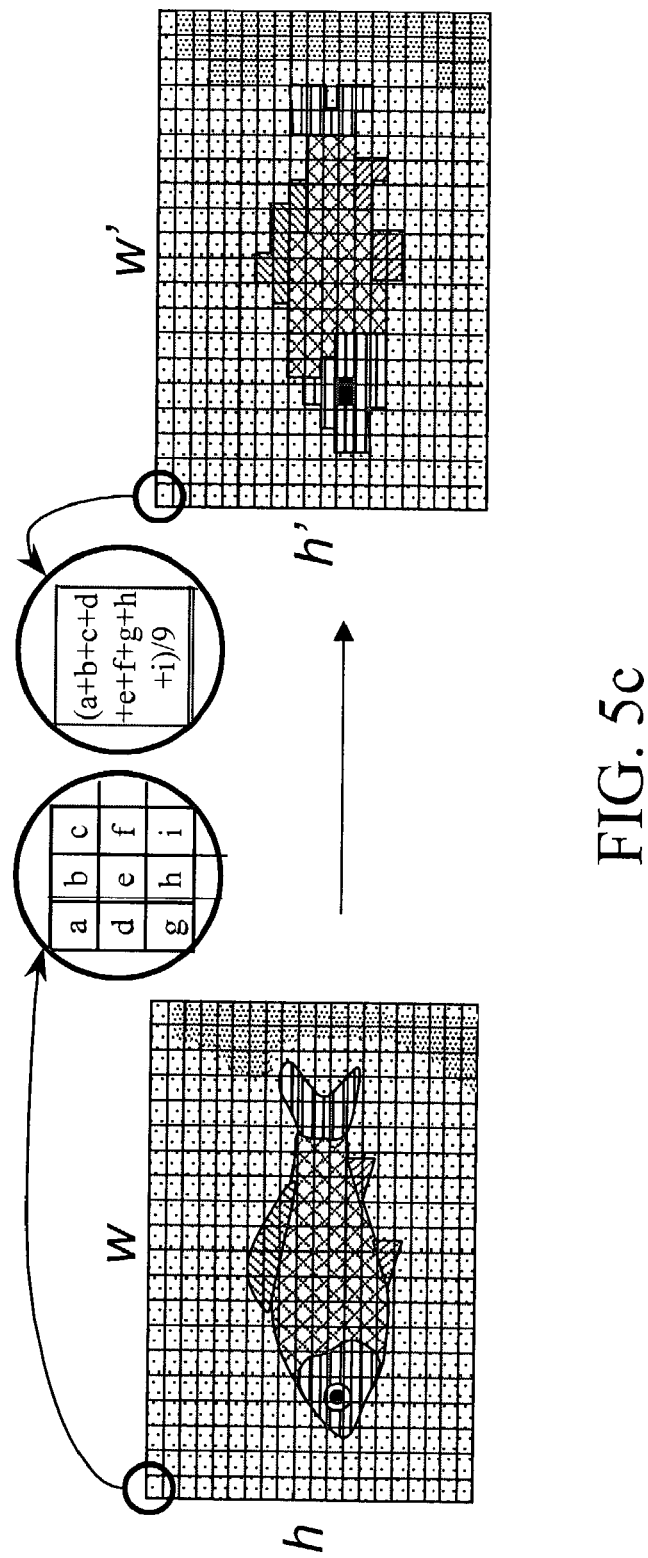
FIG. 5c illustrates the method of block division and color averaging implemented by the resolution reduction sub-module according to the invention.

According to the method of block division and color averaging, the mean color of all pixels in a block of the normalized image is assigned to the corresponding pixel in the reduced image. This is illustrated in FIG. 5c. The mean color (a+b+ . . . +i)/9 of nine pixels a~i in the block (i, j) is assigned to the corresponding pixel in the reduced image.

Each pixel in the reduced image can be considered as one block in the normalized image. The mean of color vectors for border blocks in the reduced image is computed through the border color averaging sub-module 403 according to the following equation:

$$\vec{c}_b = \frac{1}{2(h'+w')-4} \left[ \sum_{j'=1}^{w'} \vec{c}_r(1,j') + \sum_{j'=1}^{w'} \vec{c}_r(h',j') + \sum_{i'=2}^{h'-1} \vec{c}_r(i',1) + \sum_{i'=2}^{h'-1} \vec{c}_r(i',w') \right].$$

Besides the mean, other statistics such as median or mode are also feasible for averaging the color vectors for border blocks.

After having the mean of the color vector for border blocks, the comparison sub-module 405 determines the initial background blocks 415 according to the following decision rule:

$$\alpha_a^0(i',j') = \begin{cases} c_B & \text{if } (i',j') \in \text{border and } \|\vec{c}_r(i',j') - \vec{c}_b\| \le T_1, \\ c_F & \text{otherwise.} \end{cases}$$

where $c_B$ represents background color, and $c_F$ represents foreground color. In other words, if a block (i', j') is a border block, and the vector norm $\|\vec{c}_r(i',j') - \vec{c}_b\|$ *is equal to or less than a threshold* $T_1$, then the block (i', j') is a background block; otherwise, it is a foreground block. The threshold $T_1$ is a predefined parameter, or a value determined by the statistics from image analysis on the normalized image, such as mean and variance.

Having the initial background blocks 415, the growing sub-module 407 repeatedly extends the initial background blocks 415 towards the neighboring pixels to yield the final background blocks 417 based on the following decision rule which can be described as:

$$\alpha_a^k(i',j') = \begin{cases} c_B & \text{if } \alpha_a^{k-1}(i',j') = c_B, \text{ or} \\ & \alpha_a^{k-1}(i'_1,j'_1) = c_B \text{ and } \|\vec{c}_r(i',j') - \vec{c}_r(i'_1,j'_1)\| \le T_2 \text{ for some } (i'_1,j'_1) \text{ adjacent to } (i',j') \\ c_I & \text{otherwise,} \end{cases}$$

where $\alpha_a^k(i',j')$ is the background block at the $k^{th}$ iteration, and $T_2$ is a predefined parameter, or a value determined by the statistics from image analysis on the normalized image, such as mean and variance. In other words, if the block (i', j') is a background block at the k−1$^{th}$ iteration, or there exists a neighboring pixel of the block (i', j') and this neighboring pixel is a background block at the k−1$^{th}$ iteration, and the distance between their color vectors is equal to or less than a threshold $T_2$, then the block (i', j') is a background block at the $k^{th}$ iteration; otherwise, the block (i', j') is a foreground block at the $k^{th}$ iteration.

The final background blocks obtained through the decision rule are considered as the anchor blocks for interpolation. The interpolation sub-module 409 generates a solid and interpolated background mesh $M_B$ of size h×w according to the anchor blocks and the reduced image. The interpolation may be implemented with several different approaches such as triangle-based linear interpolation, triangle-based cubic interpolation, and nearest neighbor interpolation.

The normalized image and the interpolated background mesh $M_B$ are compared, and the coherent regions between them are extracted to form a background mask, i.e. α mask. The alpha mask provides the global aspect of image background/foreground information and is accurate enough for shape description. However, for images with poor contrast, it is possible that the alpha representation may suffer from small fluctuations along the background/foreground boundary. If the locally segmented regions are available, this invention further refines the alpha mask to achieve more accurate background/foreground segmentation. The following illustrates in more detail the generation and the refinement of the alpha mask.

Let $\vec{c}_m(i,j)$ be the color vector of the pixel (i, j) in the background mesh. With $\vec{c}_m(i,j)$ and $\vec{c}_n(i,j)$ the alpha mask α(i, j) that descriminates between background and foreground can be determined. Regions that are coherent between $\vec{c}_m(i,j)$ and $\vec{c}_n(i,j)$ are considered as background. The decision rule for the initial alpha mask is:

$$\alpha_{raw}(i,j) = \begin{cases} c_B & \text{if } \|\vec{c}_n(i,j) - \vec{c}_m(i,j)\| \le T_3, \\ c_F & \text{otherwise.} \end{cases}$$

where $T_3$ is a predefined parameter, or a value determined by the statistics from image analysis on the normalized image, such as mean and variance. In other words, if the distance between the color vectors of a pixel in the normalized image and the corresponding pixel in the background mesh is equal to or less than a threshold $T_3$, then the pixel in the alpha mask belongs to the background, otherwise it belongs to the foreground.

In general, the alpha mask obtained through the simple decision rule works well for most images with simple background. For database management and retrieval, the alpha mask may provide shape information accurate enough for MPEG7 adopted descriptors such as region-based shape descriptors. However, careful inspection of the initial alpha mask shown in FIG. 4b would reveal that the initial alpha mask suffers from tiny fragmentation along the background/foreground boundary. Therefore, further refinement should be performed with the aids of well-developed region-based segmentation. The refinement module 215 of this invention further improves the current region-based image segmentation methods such as mean-shift, MIT and JSEG. It accommodates the tiny fluctuations along the background/foreground boundary by adjacent major regions through clustering color pixels with spatial information included.

As mentioned before, the refinement module 215 uses a refined rule and determines a final background mask in accordance with the initial background mask and the segmented regions. The refined rule is as follows. For each region $R_k$, $|B_k| > |F_k| \Rightarrow \alpha_{final}(i,j) = c_B$ for all $(i,j) \in R_k$, $|B_k| \le |F_k| \Rightarrow \alpha_{final}(i,j) = c_F$ for all $(i,j) \in R_k$, where $B_k = \{(i,j) \in R_k | \alpha_{raw}(i,j) = c_B\}$, $F_k = \{(i,j) \in R_k | \alpha_{raw}(i,j) = c_F\}$.

In other words, if more than half of the total pixels reside in the background, then all pixels in the region are considered as background; otherwise all pixels in the region are considered as foreground. Accordingly, the final alpha mask 265 refines the tiny fluctuations along the background/foreground boundary of the initial alpha mask 273.

With the refined alpha mask, the foreground object in real image is easily obtained from the original image. The pure foreground image is obtained by masking the background region with the final alpha mask through the background removal module 217. If $\vec{c}_f$ is the color vectors for the pure foreground image, it can be expressed by the following equation:

$$\vec{c}_f(i,j) = \begin{cases} \vec{c}_o(i,j) & \text{if } \alpha_{final}(i,j) = c_F, \\ \text{white color} & \text{if } \alpha_{final}(i,j) = c_B. \end{cases}$$

Figure 6:
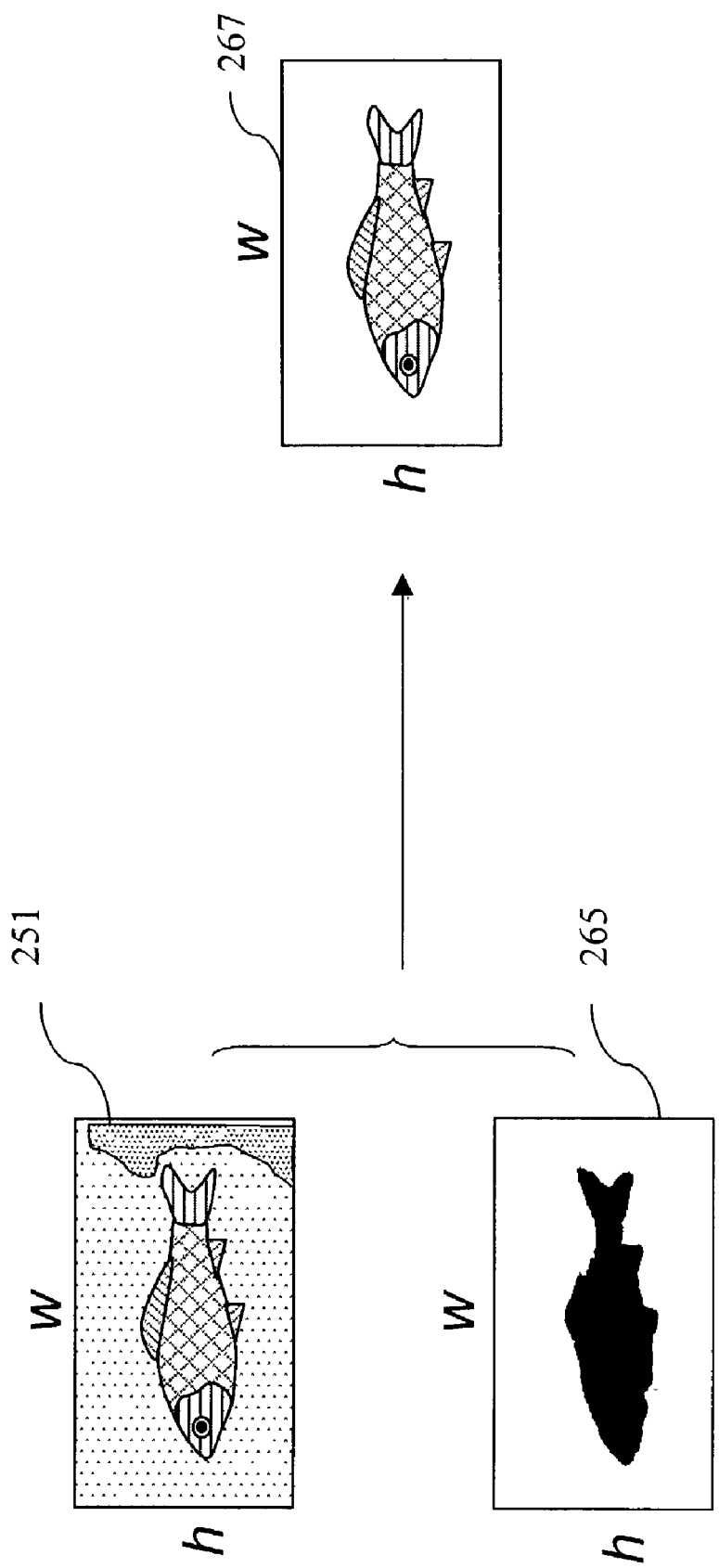
FIG. 6 illustrates the pure foreground image obtained from the original image by masking background region with a final background mask according to the invention.

In other words, if the pixel in the final alpha mask is with foreground color, then its vector color is same as that in the original image; otherwise it is with white color. For easy understanding, FIG. 6 illustrates that the pure foreground image 267 is obtained from the original image 251 by masking background region with the final alpha mask 265.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. An apparatus for removing the background of visual content, said apparatus comprising:
   a color normalization module normalizing an original image;
   an image segmentation module segmenting said normalized image into a segmented image;
   a background mesh generation module simulating the variation of pixel colors in the background of said normalized image and generating an interpolated background mesh;
   a comparison module comparing said normalized image with said interpolated background mesh to generate a background mask, said background mask being formed by identifying and extracting coherent regions between said normalized image and said interpolated background mesh;
   a refinement module generating a refined background mask according to said segmented image and said background mask; and
   a background removal module generating a foreground image by masking out background from said original image according to said refined background mask;
wherein said background mesh generation module further comprises:
   a resolution reduction sub-module reducing the resolution of said normalized image to form a reduced image, each pixel in said reduced image being regarded as one block;
   a border color averaging sub-module computing an average color vector for border blocks of said reduced image;
   a comparison sub-module locating initial background blocks on said reduced image based on a first decision rule;
   a growing sub-module repeatedly extending said initial background blocks towards neighboring pixels on said reduced image to generate final background blocks based on a second decision rule; and
   an interpolation sub-module generating an interpolated background mesh according to said reduced image and said final background blocks which serve as anchored blocks for interpolation.

2. A method for removing the background of visual content, said method comprising the steps of:
   (a) normalizing the color of an original image to form a normalized image;
   (b) segmenting said normalized image to form a segmented image;
   (c) simulating the variation of pixel colors in the background of said original image and generating an interpolated background mesh;
   (d) generating a background mask by comparing said normalized image and said interpolated background mesh, said background mask being formed by locating and extracting coherent regions between said normalized image and said interpolated background mesh;
   (e) generating a refined background mask according to said background mask and said segmented image; and
   (f) generating a foreground image by masking out background from said original image according to said refined background mask;
wherein said segmented image comprises a plurality of segmented regions and for each segmented region, if more than half of all pixels in said segmented region are covered by said background mask, then said refined background mask includes all pixels in said segmented region; otherwise all pixels in said segmented region are excluded from said refined background mask.

3. The method for removing the background of visual content as claimed in claim 2, wherein said step (a) rescales the intensities of red, green and blue components of said original image so that said intensities of red, green and blue components have a minimum value 0 and a maximum value 255 after normalization.

4. The method for removing the background of visual content as claimed in claim 2, wherein said step (a) rescales the intensities of red, green and blue components of said original image according to the following linear equations:

$$r_n(i,j) = \frac{r_o(i,j) - r_{\min}}{r_{\max} - r_{\min}} \times 255,$$

where $r_{\max} = \max_{i,j}(r_o(i,j))$ and $r_{\min} = \min_{i,j}(r_o(i,j))$, $$g_n(i,j) = \frac{g_o(i,j) - g_{\min}}{g_{\max} - g_{\min}} \times 255,$$

where $g_{\max} = \max_{i,j}(g_o(i,j))$ and $g_{\min} = \min_{i,j}(g_o(i,j))$, $$b_n(i,j) = \frac{b_o(i,j) - b_{\min}}{b_{\max} - b_{\min}} \times 255,$$

where $b_{\max} = \max_{i,j}(b_o(i,j))$ and $b_{\min} = \min_{i,j}(b_o(i,j))$, wherein $r_o(i,j)$, $g_o(i,j)$, and $b_o(i,j)$ denote the intensities of R, G, B components in pixel (i, j) of said original image respectively, $r_n(i,j)$, $g_n(i,j)$, and $b_n(i,j)$ denote the intensities of R, G, B components in pixel (i, j) of said normalized image respectively, and min and max denote maximum and minimum functions respectively.

5. The method for removing the background of visual content as claimed in claim 2, wherein in said step (d) a pixel belongs to said background mask if the distance between color vectors of said pixel in said normalized image and a corresponding pixel in said background mesh is equal to or less than a threshold $T_3$; otherwise said pixel belongs to foreground; wherein said threshold $T_3$ is a predefined parameter, or a value determined by statistics from image analysis of said normalized image.

6. The method for removing the background of visual content as claimed in claim 2, wherein said foreground image in step (f) is generated by assigning a white color to a pixel in said foreground image if said pixel is covered by said refined background mask, and assigning the color vector of a corresponding pixel on said original image if said pixel is not covered by said refined background mask.

7. A method for removing the background of visual content, said method comprising the steps of:
   (a) normalizing the color of an original image to form a normalized image;
   (b) segmenting said normalized image to form a segmented image;
   (c) simulating the variation of pixel colors in the background of said original image and generating an interpolated background mesh;
   (d) generating a background mask by comparing said normalized image and said interpolated background mesh, said background mask being formed by locating and extracting coherent regions between said normalized, image and said interpolated background mesh;
   (e) generating a refined background mask according to said background mask and said segmented image; and
   (f) generating a foreground image by masking out background from said original image according to said refined background mask;
wherein said step (c) further comprises the steps of:
   (c1) forming a reduced image by reducing the resolution of said normalized image, each pixel in said reduced image being regarded as one block;
   (c2) computing an average color vector for border blocks of said reduced image;
   (c3) locating initial background blocks on said reduced image based on a first decision rule;
   (c4) repeatedly extending said initial background blocks towards neighboring pixels on said reduced image to generate final background blocks based on a second decision rule; and
   (c5) generating an interpolated background mesh according to said reduced image and said final background blocks which serve as anchored blocks for interpolation.

8. The method for removing the background of visual content as claimed in claim 7, said reduced image in said step (c1) being generated in accordance with a uniformly distributed pixel mapping defined as:

$$\overline{c_r}(i', j') = \overline{c_n}(i, j), \text{ for } i'=1, 2, \ldots, h', j'=1, 2, \ldots, w',$$
$$i=1, 2, \ldots, h, j=1, 2, \ldots, w,$$

wherein $$i = \left[1 + \frac{h-1}{h'-1}(i'-1)\right], j = \left[1 + \frac{w-1}{w'-1}(j'-1)\right],$$

$[x]$ means rounding x to a nearest integer, $\vec{c_n}(i, j)$ is a color vector of said normalized image at pixel $(i, j)$ and $\vec{c_r}(i', j')$ is a color vector of said reduced image at pixel $(i', j')$.

9. The method for removing the background of visual content as claimed in claim 7, said reduced image in said step (c1) being generated in accordance with a block division and color averaging method in which an average color of all pixels in a block of said normalized image is assigned to a corresponding pixel in said reduced image.

10. The method for removing the background of visual content as claimed in claim 7, wherein said average color vector for border blocks of said reduced image in step (c2) is a mean of color vectors of border blocks of said reduced image.

11. The method for removing the background of visual content as claimed in claim 7, wherein said average color vector for border blocks of said reduced image in step (c2) is a median of color vectors of border blocks of said reduced image.

12. The method for removing the background of visual content as claimed in claim 7, wherein said average color vector for border blocks of said reduced image in step (c2) is a mode of color vectors of border blocks of said reduced image.

13. The method for removing the background of visual content as claimed in claim 7, wherein said first decision rule in step (c3) defines a block $(i', j')$ as a background block if said block $(i', j')$ is a border block and a vector norm $\|\overline{c_r}(i', j') - \overline{c_b}\|$ is equal to or less than a threshold $T_1$; otherwise said block $(i', j')$ is defined as a foreground block; wherein $\overline{c_b}$ is said average color vector for border blocks in said reduced image, $\overline{c_r}(i', j')$ is a color vector for block $(i', j')$ in said reduced image, and said threshold $T_1$ is a predefined parameter, or a value determined by statistics from image analysis of said normalized image.

14. The method for removing the background of visual content as claimed in claim 7, wherein said second decision rule in step (c4) defines a block $(i', j')$ as a background block at $k^{th}$ iteration if said block $(i', j')$ is a background block at $k-1^{th}$ iteration, or said block $(i', j')$ has a neighboring pixel which is a background block at $k-1^{th}$ iteration and the distance between color vectors of said block $(i', j')$ and said neighboring pixel is equal to or less than a threshold $T_2$; otherwise said block $(i', j')$ is defined as a foreground block at $k^{th}$ iteration; wherein said threshold $T_2$ is a predefined parameter, or a value determined by statistics from image analysis of said normalized image.

15. The method for removing the background of visual content as claimed in claim 7, said interpolation in step (c5) being a triangle-based interpolation.

16. The method for removing the background of visual content as claimed in claim 7, said interpolation in step (c5) being a nearest neighbor interpolation.

17. The method for removing the background of visual content as claimed in claim 7, wherein said step (a) rescales the intensities of red, green and blue components of said original image so that said intensities of red, green and blue components have a minimum value 0 and a maximum value 255 after normalization.

18. The method for removing the background of visual content as claimed in claim 7, wherein said step (a) rescales the intensities of red, green and blue components of said original image according to the following linear equations:

$$r_n(i, j) = \frac{r_o(i, j) - r_{\min}}{r_{\max} - r_{\min}} \times 255,$$

where $r_{\max} = \max_{i,j}(r_o(i, j))$ and $r_{\min} = \min_{i,j}(r_o(i, j))$, -continued $$g_n(i, j) = \frac{g_o(i, j) - g_{min}}{g_{max} - g_{min}} \times 255,$$

where $g_{max} = \max_{i,j}(g_o(i, j))$ and $g_{min} = \min_{i,j}(g_o(i, j))$, $$b_n(i, j) = \frac{b_o(i, j) - b_{min}}{b_{max} - b_{min}} \times 255,$$

where $b_{max} = \max_{i,j}(b_o(i, j))$ and $b_{min} = \min_{i,j}(b_o(i, j))$, wherein $r_o(i, j)$, $g_o(i, j)$, and $b_o(i, j)$ denote the intensities of R, G, B components in pixel (i, j) of said original image respectively, $r_n(i, j)$, $g_n(i, j)$, and $b_n(i, j)$ denote the intensities of R, G, B components in pixel (i, j) of said normalized image respectively, and min and max denote maximum and minimum functions respectively.

19. The method for removing the background of visual content as claimed in claim 7, wherein in said step (d) a pixel belongs to said background mask if the distance between color vectors of said pixel in said normalized image and a corresponding pixel in said background mesh is equal to or less than a threshold $T_3$; otherwise said pixel belongs to foreground; wherein said threshold $T_3$ is a predefined parameter, or a value determined by statistics from image analysis of said normalized image.

20. The method for removing the background of visual content as claimed in claim 7, wherein said foreground image in step (f) is generated by assigning a white color to a pixel in said foreground image if said pixel is covered by said refined background mask, and assigning the color vector of a corresponding pixel on said original image if said pixel is not covered by said refined background mask.

* * * * *